United States Patent [19]

Conley, Jr.

[11] Patent Number: 5,460,408
[45] Date of Patent: Oct. 24, 1995

[54] AUTOMATIC MODULAR AIR BAG CONSTRUCTION SYSTEM

[75] Inventor: Ralph F. Conley, Jr., Miamisburg, Ohio

[73] Assignee: MIM Industries, Inc., Miamisburg, Ohio

[21] Appl. No.: 78,449

[22] Filed: Jun. 16, 1993

[51] Int. Cl.$^6$ ............................................. B60R 21/16
[52] U.S. Cl. ........................ 280/743.1; 83/29; 280/728.1
[58] Field of Search ..................... 280/743 R, 728 R; 83/29, 55

[56] References Cited

U.S. PATENT DOCUMENTS

| | | | |
|---|---|---|---|
| 4,043,234 | 8/1977 | Godin et al. | 83/55 |
| 4,285,257 | 8/1981 | Eberle et al. | 83/29 |
| 5,114,180 | 5/1992 | Kami et al. | 280/743 R |

FOREIGN PATENT DOCUMENTS

| | | | |
|---|---|---|---|
| 1149592 | 5/1963 | Germany | 83/29 |
| 2528636 | 1/1976 | Germany | 280/743 R |
| 4-66347 | 3/1992 | Japan | 280/728 R |

*Primary Examiner*—Eric D. Culbreth
*Attorney, Agent, or Firm*—Biebel & French

[57] ABSTRACT

A modular air bag construction system is disclosed wherein an air bag is constructed by providing a main panel, attaching reinforcing material to predetermined locations on the main panel and forming holes through the main panel at the predetermined locations, and subsequently attaching a face panel to the main panel and trimming the face and main panels to a desired rounded configuration. The present system uses substantially rectangular panels whereby conveying and accurate placement of the panels is facilitated. The present system is conducive for implementation as an automated system and eliminates expensive and time consuming precutting of the air bag components.

4 Claims, 6 Drawing Sheets

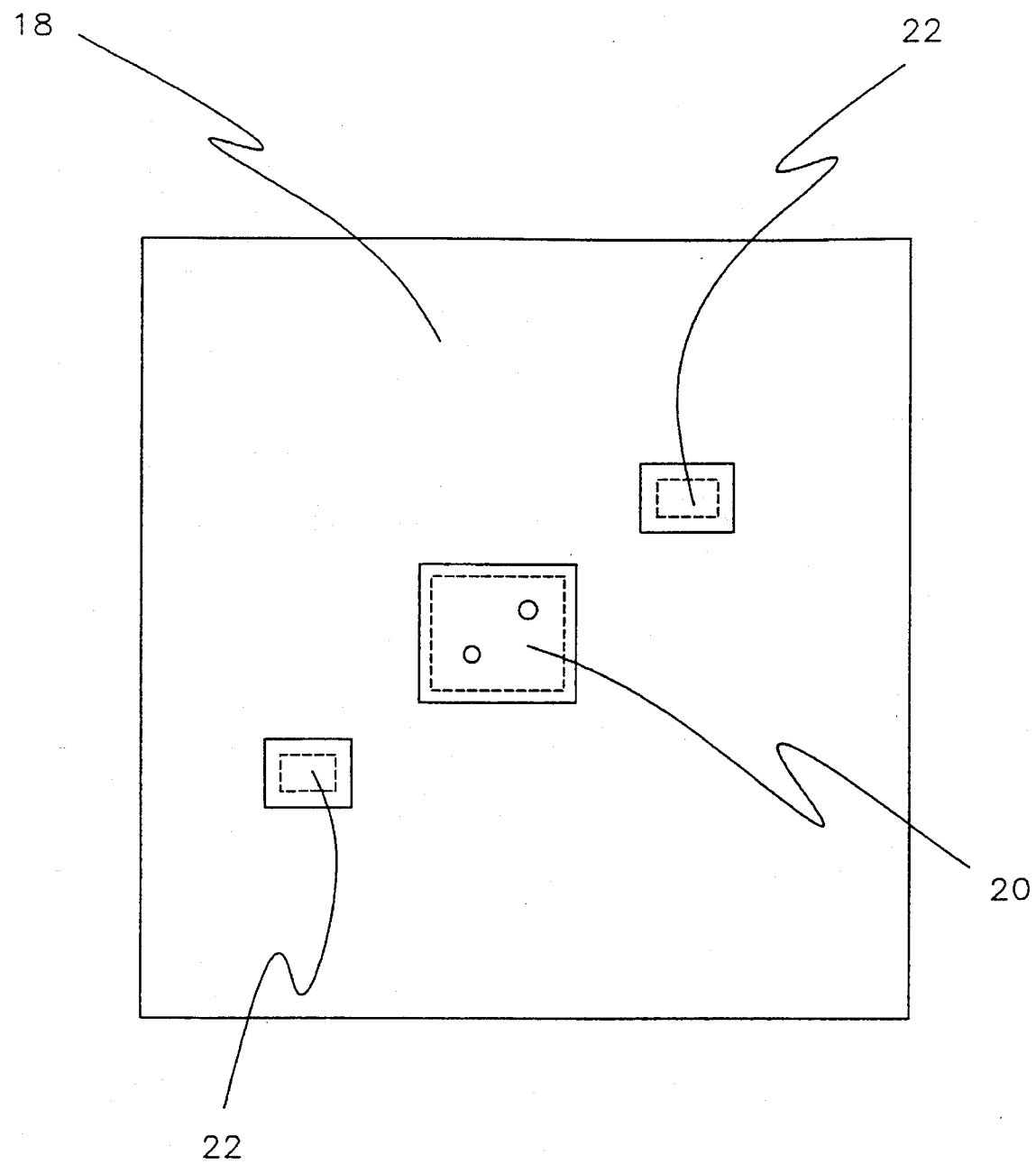

AUTOMATIC MODULAR AIR BAG CONSTRUCTION SYSTEM

BACKGROUND OF THE INVENTION

1. Field of the Invention

The present invention relates to an air bag construction system and, more particularly, to a modular air bag construction system for facilitating automated manufacture of air bags.

2. Related Prior Art

With the increasing popularity of air bags as an additional restraint system in automobiles, there is a corresponding need for manufacturing methods and apparatus which facilitate the construction of the air bags and thereby also reduce the time and cost of constructing the air bags. Conventional air bags are typically constructed from various precut components which are combined into a single assembly forming the air bag.

FIG. 1 illustrates a conventional air bag construction including a main panel 10 which is precut to a circular shape and which includes various precut holes 12 formed therein. The precut holes 12 are reinforced with small precut panels 14 which include holes corresponding to the precut holes 12. The precut panels 14 must be carefully aligned with the precut holes 12 and are attached to the main panel 10 to thereby reinforce the main panel 10 around the area of the holes 12. For example, the grain of the material of each of the small precut panels 14 must be oriented at a predetermined angle relative to the grain of the main panel 10, as well as relative to the grain of adjacent small precut panels, in order to obtain maximum material strength in the reinforced areas. To complete the construction of the air bag, a precut face panel 16 must be aligned with the main panel 10, and the main and face panels 10, 16 are joined to each other by a seam formed around the perimeter thereof.

It has been found that constructing air bags from precut components, such as those shown in FIG. 1, is inefficient and expensive in that the components typically are cut using expensive laser and/or ultrasonic cutting techniques, and the alignment of the various components to each other has proven to be a time consuming and meticulous operation.

Accordingly, there is a need for a system for producing an air bag of the same integrity and quality as conventional air bags while making it easier and less expensive to manufacture the air bag.

SUMMARY OF THE INVENTION

The present invention provides a system for constructing air bags wherein the system for constructing the air bags is facilitated by automation and a minimal amount of precutting for the air bag components is required.

In one aspect of the invention, a method of constructing an air bag is disclosed comprising the steps of: providing a main panel, positioning at least one piece of reinforcing material at a predetermined location on the main panel, forming a hole through the main panel and the reinforcing material at the predetermined location, and attaching a face panel to the main panel.

The main panel and face panel are each preferably fed off of a roll of supply material such that the panels have a substantially rectangular shape throughout the construction of the air bag. In one of the final operations for forming the air bag, the face panel is attached to the main panel along a seal line and excess material is trimmed away from the main panel and face panel adjacent to the seal line to form a rounded shape for the air bag.

In a further aspect of the invention, a system for constructing air bags is provided comprising: an attachment station for attaching the pieces of reinforcing material to the main panel, a hole cutting station for forming holes through the main panel and the reinforcing material, and a sealing station for sealing the face panel to the main panel. In addition, means are provided at the sealing station which preferably cuts the main and face panels simultaneously with the operation of sealing the face panel to the main panel.

Therefore, it is an object of the present invention to provide a modular air bag construction system which is conducive to automation and which requires a minimum of precutting for the parts prior to assembly of the air bag.

Other objects and advantages of the invention will be apparent from the following description, the accompanying drawings, and the appended claims.

DETAILED DESCRIPTION OF THE PREFERRED EMBODIMENT

FIGS. 4A–4C are plan views illustrating the different stages of construction for the air bag of the present invention.

DETAILED DESCRIPTION OF THE PREFERRED EMBODIMENT

Figure 1:
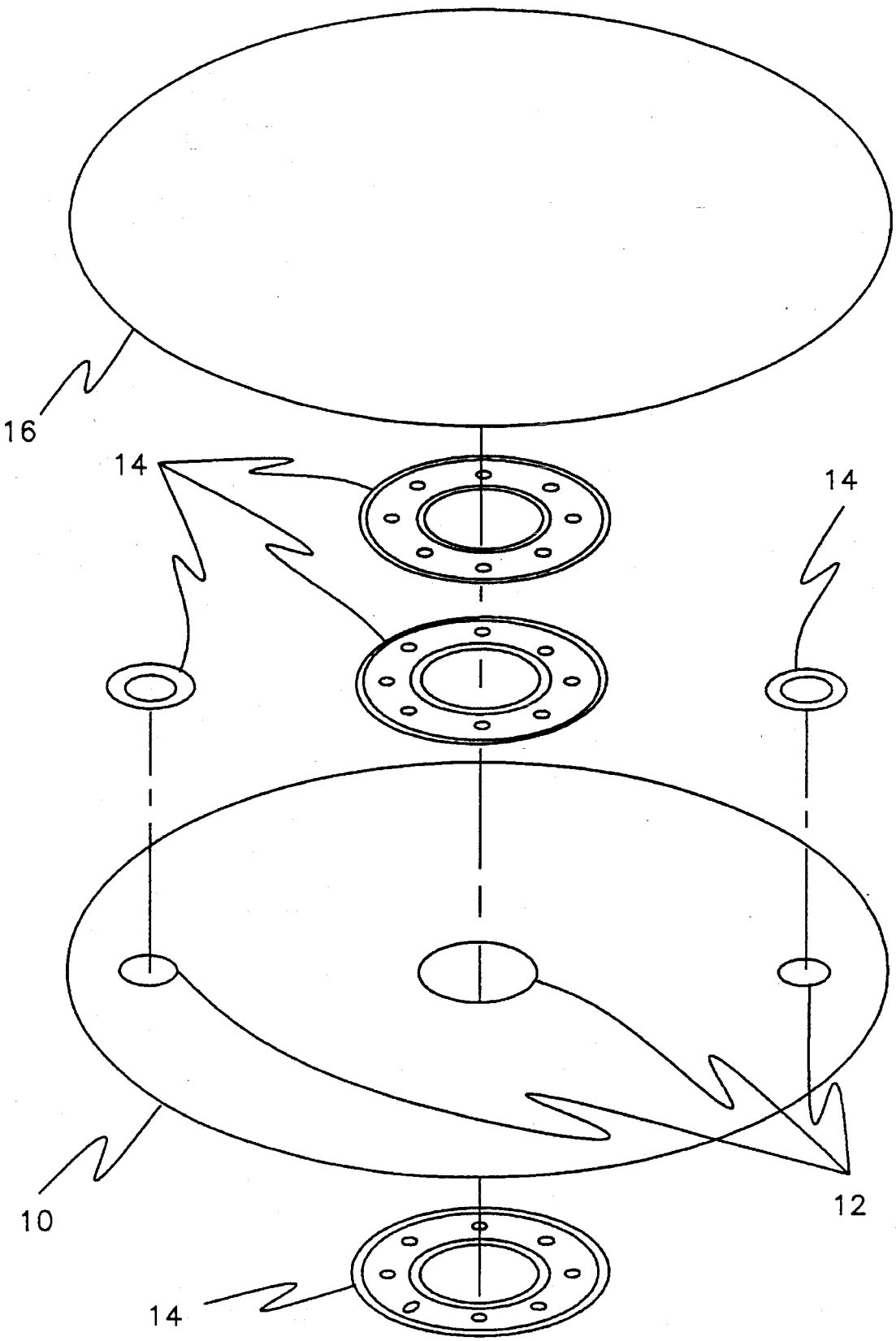
FIG. 1 is an exploded view of precut components making up a conventional prior art air bag.
Figure 2:
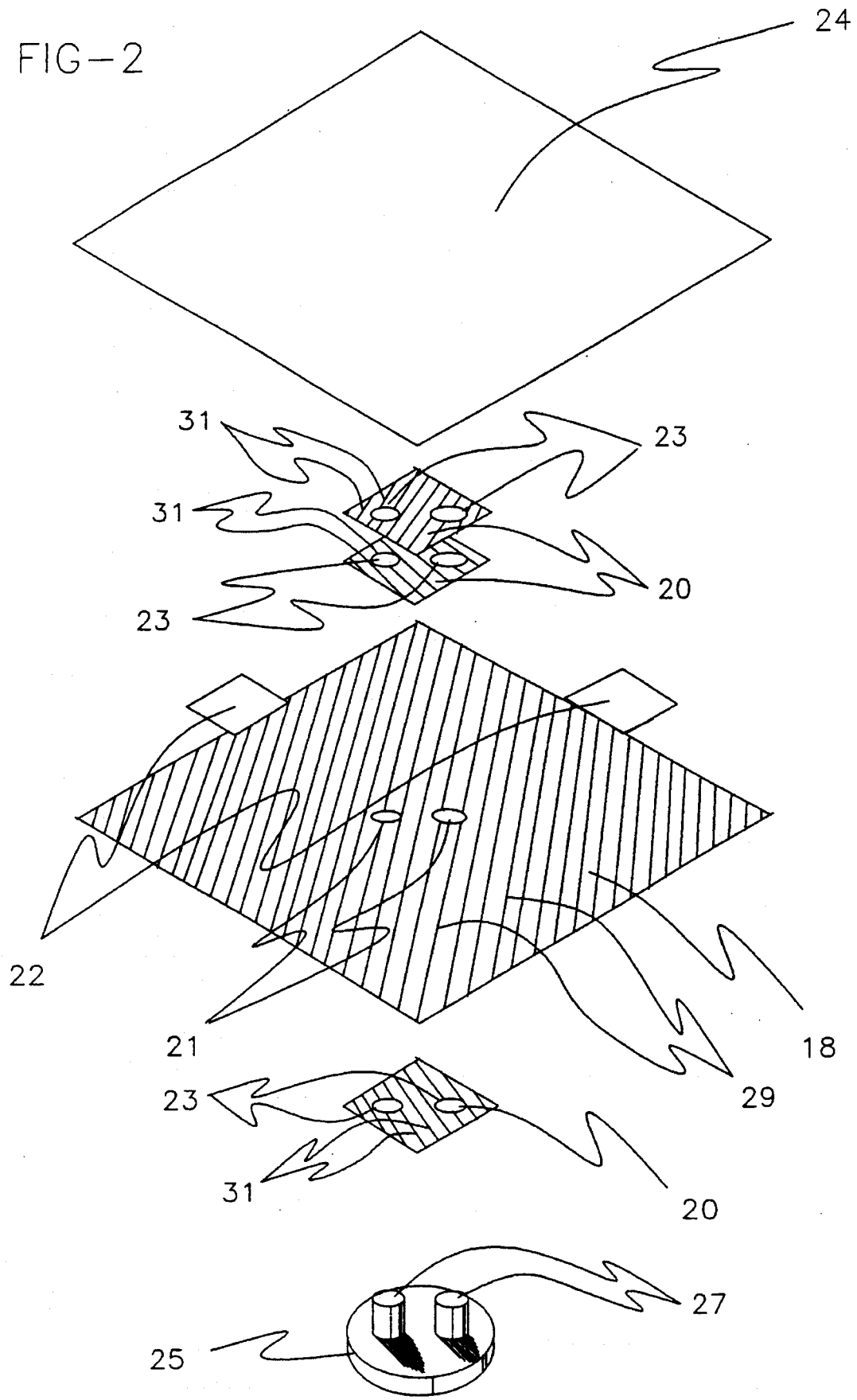
FIG. 2 is an exploded view of components for use in the air bag construction system of the present invention.

Referring to FIG. 2, the components for making up the air bag in accordance with the system of the present invention are shown in exploded relation to each other and include a main panel 18, inflator hole reinforcement panels 20, vent hole reinforcement panels 22 and a face panel 24.

Each of the main and face panels 18, 24 and hole reinforcement panels 20, 22 are preferably provided from respective material supply rolls. For example, the main and face panels 18, 24 may be supplied by supply rolls 19 and 25, respectively, and the reinforcement panels 20, 22 may be supplied by supply rolls 21, as is depicted diagrammatically in FIG. 3. In addition, subsequent to the main panel 18 and reinforcement panels 20 being fed from their respective supply rolls, these panels are preferably provided with an alignment aperture or apertures 21 and 23, respectively, and an alignment member 25 having alignment pins 27 is provided to extend through the apertures 21, 23 whereby the inflator hole reinforcement panels 20 are held in alignment at a predetermined location on the main panel 18.

The present invention provides a system for constructing an air bag whereby the various panels are stacked or combined together prior to the formation of inflator and vent holes formed at the locations of the inflator and vent hole reinforcement panels 20, 22. In addition, it should be noted that the present invention is adapted to provide for a particular orientation of the grain of the material forming the inflator reinforcement panels 20 relative to each other as well as relative to the main panel 18 whereby the strength of the air bag panels is maintained. Specifically, the present invention permits the panels 18 and 20 to be oriented such that the grain of each panel is oriented at a 45° angle relative to the grain of adjacent panels, as is illustrated by the grain lines 29 and 31 on the panels 18 and 20, respectively. In order to accomplish this alignment, the alignment apertures 21, 23 are preferably formed in the panels 18, 20 as they are fed from their respective supply rolls, and the alignment pins 27 ensure that the desired relative orientation or alignment between adjacent ones of the panels 18, 20 is maintained during the assembly of the air bag and prior to the attachment of the panels to each other.

Referring further to FIGS. 3 and 4A–4C, the system for constructing the air bag is illustrated diagrammatically. Initially, a material supply station 26 for supplying the main panel 18 and the reinforcement panels 20, 22 feeds a substantially rectangular main panel 18, as well as the reinforcement panels 20, 22 to an alignment aperture punching station 28 wherein the alignment apertures 21, 23 are punched in the main panel 18 and the inflator reinforcement panels 20.

Subsequently, the panels 18, 20, 22 are transferred to a preload assembly station 30 where the reinforcement panels 20, 22 are aligned with predetermined locations on the main panel 18 and temporarily attached to the main panel 18 by conventional means such as a tack or spot weld. In addition, at the preload assembly station 30, the alignment member 25 is brought into association with the main panel 18 and inflator reinforcement panels 20 and the alignment pins 27 are positioned passing through the alignment apertures 21, 23 in the main panel 18 and inflator reinforcement panels 20. In this manner the proper orientation of the grain lines 29, 31 relative to each other is established prior to the step of providing temporary attachment of the reinforcement panels 20, 22 to the main panel 18.

The assembly consisting of the main panel 18 and reinforcement panels 20, 22 is then conveyed to an attachment station 32 wherein the reinforcement panels 20, 22 are permanently attached to the main panel 18 by a conventional sewing machine, or alternatively, an ultrasonic bonding system. Upon completion of the attachment operation, the main panel 18 will have the appearance illustrated in FIG. 4A.

Figure 4B:
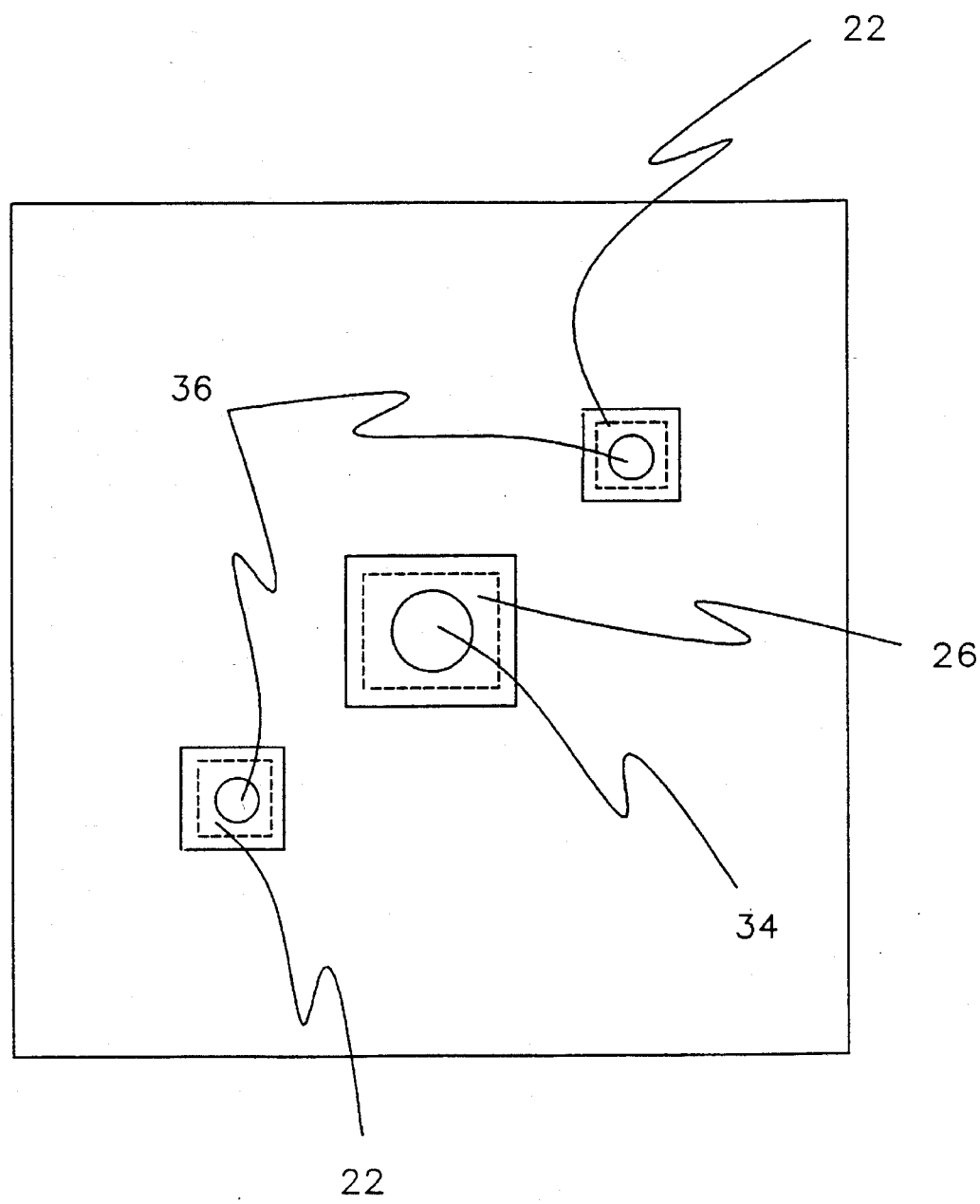

Subsequent to the attachment of the reinforcement panels 20, 22 to the main panel 18, the main panel 18 will be conveyed to a hole cutting station 38. A machine is located in this station for forming holes through the main panel 18 and the reinforcement panels 20, 22 at the predetermined locations on the main panel 18. The machine for forming the holes may be either in the form of a machine for punching out the holes or a machine for ultrasonically cutting the holes. FIG. 4B illustrates the main panel 18 and reinforcement panels 20, 22 subsequent to an inflator hole 34 and vent holes 36 having been cut therethrough. It should be noted that the position of the alignment holes 21, 23 is selected such that when the inflator hole 34 has been cut in the main panel 18, the inflator holes 21, 23 will be removed with the scrap material produced as the hole 34 is formed.

Figure 4C:
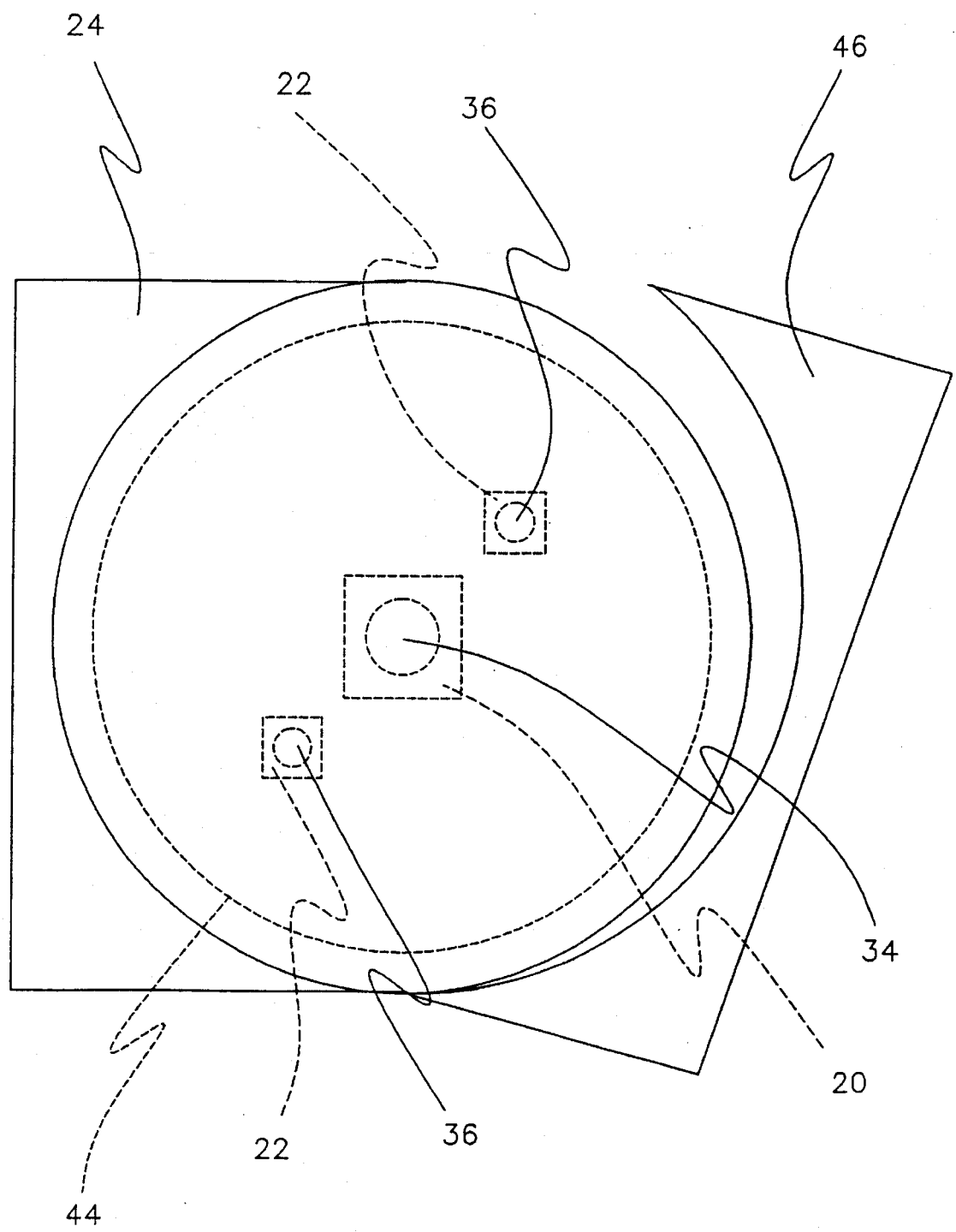

After the holes 34, 36 have been formed, the main panel 18 is conveyed to a seal and trim station 40 and is aligned within the seal and trim station 40 with reference to the inflator hole 34. With the main panel 18 thus aligned, a substantially rectangular face panel 24 is fed and cut from a supply roll in a face panel material supply station 42 and is placed in alignment over the main panel 18. The seal and trim station 40 is provided with either a sewing machine or ultrasonic bonding system to form a seal line 44 whereby the face panel 24 is attached to the main panel 18 in sealing engagement. The seal line 44 surrounds the holes 34, 36 and defines an outer rounded contour shape for the air bag. Excess material 46 of the main panel 18 and face panel 24 surrounding the seal line 44 is also cut or trimmed off at the seal and trim station 40, and the trimming operation preferably takes place simultaneously with the formation of the seal line 44. FIG. 4C illustrates the partially formed air bag in the seal and trim station 40 wherein a portion of the excess material 46 has been partially cut away from the area surrounding the seal line 44.

It should be noted that by utilizing a substantially rectangular main panel 18 throughout the various stages of the construction of the air bag prior to reaching the seal and trim station 40, the operation of conveying and accurately aligning the main panel 18 in the various stations is facilitated. Further, the rectangular shape of the main panel 18, the reinforcement panels 20, 22 and the face panel 24 facilitate automation of the air bag construction system in that accurate determination of the particular orientation and predetermined locations on the various panels is simplified through the provision of squared off reference edges, and it is contemplated to eliminate the provision of the alignment holes and rely on use of the edges of the panels to obtain proper alignment of the panels in a fully automated system.

Also, if desired, the present system may be adapted to use existing panels which have been precut. For example, the panels could be provided in a rectangular or round shape, but wherein the inflator holes have not yet been formed. In an embodiment using round panels, the alignment apertures will be formed in the main panel and inflator reinforcement panels, as in the above-described embodiment, to facilitate proper alignment of the panels relative to each other. However, the use of round panels may require additional manual operations for the proper placement of the panels, which operations preferably would not be required when using rectangular panels.

It should also be noted that after the final assembly step at the seal and trim station 40, a tether strap may be installed, if required, and the air bag assembly must be turned inside out such that the cut edge along the seal line will be located on the inside of the air bag.

In addition, although the present modular air bag construction system has been described referring to the provision of vent reinforcement panels 20, 22 and vent holes 34, the present system may also be used without the provision of vent holes.

Figure 3:
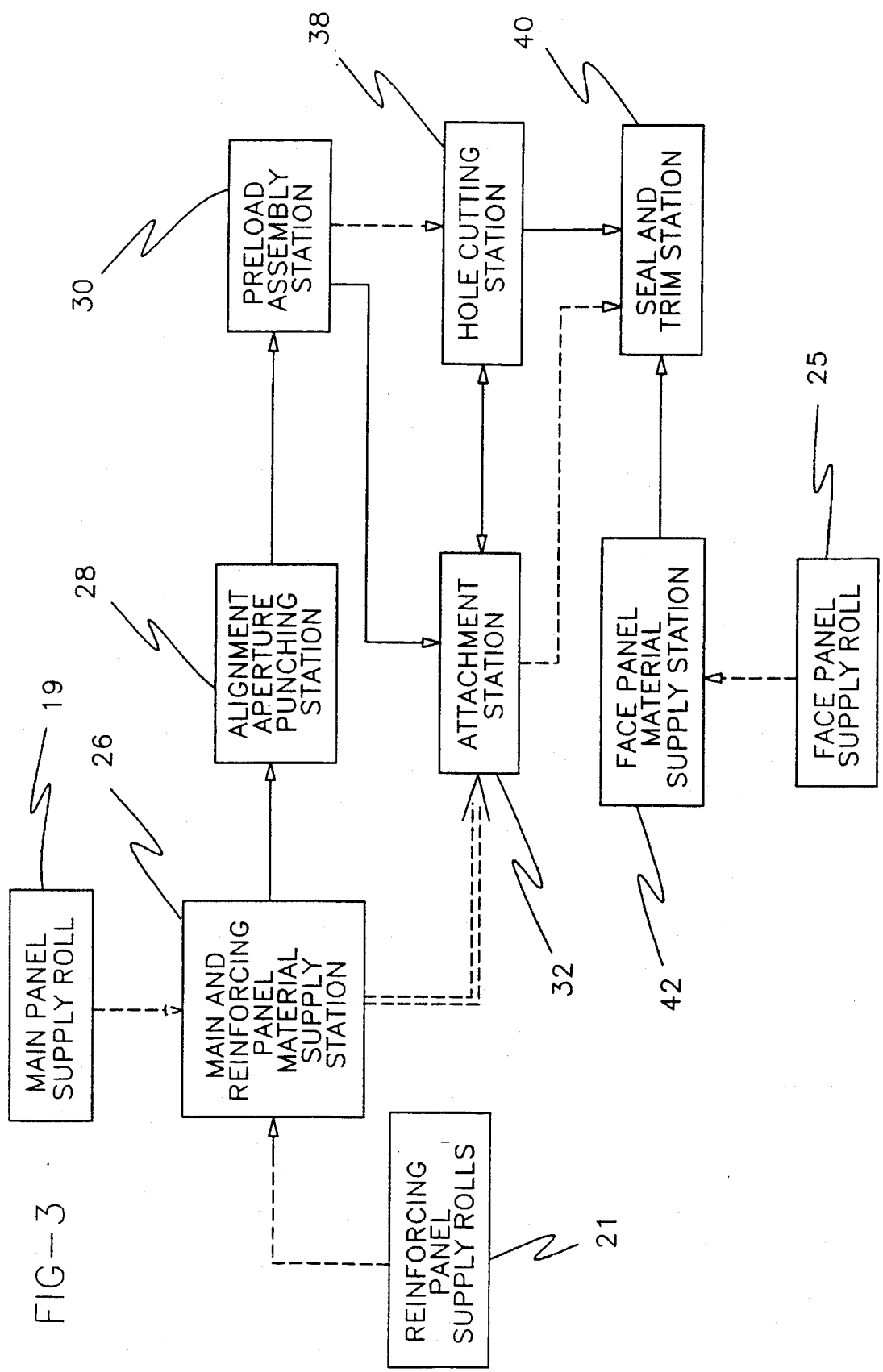
FIG. 3 is a block diagram of a system adapted for automated construction of the air bag of the present invention.

Further, it should be noted that the order of the steps for attaching the reinforcement panels and for cutting the holes may be reversed in the present system, as is illustrated by the single dotted lines in FIG. 3. In such an altered system, the main panel with the temporarily attached reinforcement panels will be conveyed first to the hole cutting station for cutting the vent and inflator holes, and subsequently conveyed to the attachment station for permanently attaching the reinforcement panels to the main panel.

Alternatively, a further embodiment of the system of the present invention comprises conveying the main panel material and reinforcing panel materials directly to the attachment station and hole cutting station, as depicted by the double dotted line, where the panels are aligned in their predetermined locations and subsequently attached together and the holes are cut prior to transfer to the seal and trim station. In this embodiment, provision of the alignment holes in the panels is eliminated, as is the step of providing preliminary alignment of the panels. Additionally, the attachment station and hole cutting station may be combined into a single station wherein attachment and cutting of the holes is performed at substantially the same location.

From the above description, it should be apparent that the present invention provides a system for assembling air bags wherein uncut panels may be positioned in stacked relationship and in a predetermined alignment with each other prior to subsequent operations of cutting holes in the panels and attaching the panels to each other. In addition, it should be apparent that the present invention also provides a system wherein the final shape of the main and face panels may be defined in a final operation wherein the panels are sealed together while simultaneously trimming the access material surrounding the seal line.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of constructing an air bag comprising the steps of:

providing a main panel, positioning at least one piece of reinforcing material at a predetermined location on said main panel, forming a hole through said main panel and said reinforcing material at said predetermined location, attaching a face panel to said main panel, and wherein said reinforcing material is attached to said main panel prior to said step of forming said hole, and said reinforcing material is positioned on and temporarily attached to the main panel at a preload station.

2. The method as in claim 1 wherein said main panel and said reinforcing material are moved from a preload station to a station for permanently attaching said reinforcing material to said main panel prior to said step of forming said hole.

3. A method of constructing an air bag comprising the steps of:

feeding and cutting a main panel from a supply roll of material, attaching at least one piece of reinforcing material to a predetermined location on said main panel, forming a hole through said main panel and said reinforcing material at said predetermined location, feeding and cutting a face panel from a supply roll of material, attaching said face panel to said main panel along a seal line extending around the periphery of the air bag, and further including the step of trimming excess material from areas adjacent to said seal line as said face panel is attached to said main panel.

4. A method of constructing an air bag comprising the steps of:

feeding and cutting a substantially rectangular main panel from a supply roll of material, placing said substantially rectangular main panel in an attachment station, feeding and cutting reinforcing material from a supply roll of material, attaching said reinforcing material to a predetermined location of said main panel at said attachment station, conveying said main panel from said attachment station to a hole cutting station, forming a hole through said main panel and said reinforcing material at said predetermined location, conveying said main panel from said hole cutting station to a sealing station, feeding and cutting a substantially rectangular face panel from a supply roll of material, aligning said face panel with said main panel in said sealing station, and substantially simultaneously forming a seal line around the perimeter of the air bag and trimming excess material of said main panel and said face panel from areas adjacent to said seal line to define a rounded configuration for the air bag.

* * * * *